United States Patent [19]
Massey et al.

[11] Patent Number: 4,909,275
[45] Date of Patent: Mar. 20, 1990

[54] LATCHING HANDLE

[75] Inventors: Roger G. Massey, Exeter; David G. Holloway, Concord; Kenneth I. Walton, Deerfield, all of N.H.

[73] Assignee: Parker and Harper Manufacturing Company, Inc., Worcester, Mass.

[21] Appl. No.: 115,205

[22] Filed: Nov. 2, 1987

[51] Int. Cl.⁴ ............................................. F16K 35/00
[52] U.S. Cl. ...................................... 137/385; 251/95; 251/104; 267/158
[58] Field of Search ................... 251/95, 96, 101, 102, 251/104; 137/385, 384.2; 267/158

[56] References Cited

U.S. PATENT DOCUMENTS

| | | | |
|---|---|---|---|
| 3,207,546 | 9/1965 | Ernest | 267/158 |
| 3,228,415 | 1/1966 | Geiss | 251/101 |
| 4,534,379 | 8/1985 | Burge | 137/385 |

FOREIGN PATENT DOCUMENTS

| | | | |
|---|---|---|---|
| 28945 | 7/1967 | Japan | 251/101 |
| 28946 | 7/1967 | Japan | 251/101 |

Primary Examiner—A. Michael Chambers
Attorney, Agent, or Firm—Thomas N. Tarrant

[57] ABSTRACT

A ball valve is described having a latching handle with a latch plate having raised lugs that engage the handle, a latch mechanism or both to act as detent stops in predetermined rotational positions. A flat spring rolled at one end urges the latch mechanism into the latched position and a pivoting cap secured to the handle is latched by simultaneous action of the latch mechanism to block access to a nut securing the handle assembly. Provision is made for attaching a padlock.

5 Claims, 2 Drawing Sheets

LATCHING HANDLE

BACKGROUND OF THE INVENTION

1. Field of the Invention:

The present invention relates to handle assemblies for turning rotational shafts such as valve stems and in particular to such handle assemblies that include latching means to lock rotational movement in predetermined specific positions.

2. Relation to the Prior Art:

It has been common to provide control handles with stops at "off" and "on" locations. It has also been common to provide spring-loaded detents at several locations. Frequently there is a need to prevent accidental or negligent turning of a control. When dealing with dangerous chemicals or electricity, there can be a safety hazard. Costly production losses can occur due to a control misadjustment. There is also a need to lock controls against malicious mischief and theft.

SUMMARY OF THE INVENTION:

In accordance with the present invention, a latching handle for rotational control devices is provided having a latch plate securable over the shaft of a control device in a predetermined position, a handle securable over the shaft for rotation, a latch mechanism built into the handle for engaging the plate at predetermined positions of rotation of the handle, a spring for urging the latch mechanism into a latched position and a manually operable release for retracting said latch from the latched position.

A further inventive feature is a cap over a nut securing the handle on the shaft. The latching mechanism latches the cap in place at the same time it engages the latch plate so that a single padlock can secure both.

Thus it is a purpose of the invention to provide a handle for control devices that latches in a predetermined rotational position.

It is a further purpose to provide a latch plate that mates with a control device body to allow convenient retrofitting of latching handles.

It is a further feature to provide a cap for preventing removal of a latching assembly.

It is still a further feature to provide a novel spring for loading a latching mechanism.

Further objects and features of the invention will become apparent upon reading the following description together with the drawing.

DESCRIPTION OF THE PREFERRED EMBODIMENT:

While the invention can be used with a variety of control devices, it was developed for use on a ball valve and will be described in such use.

Figure 1:
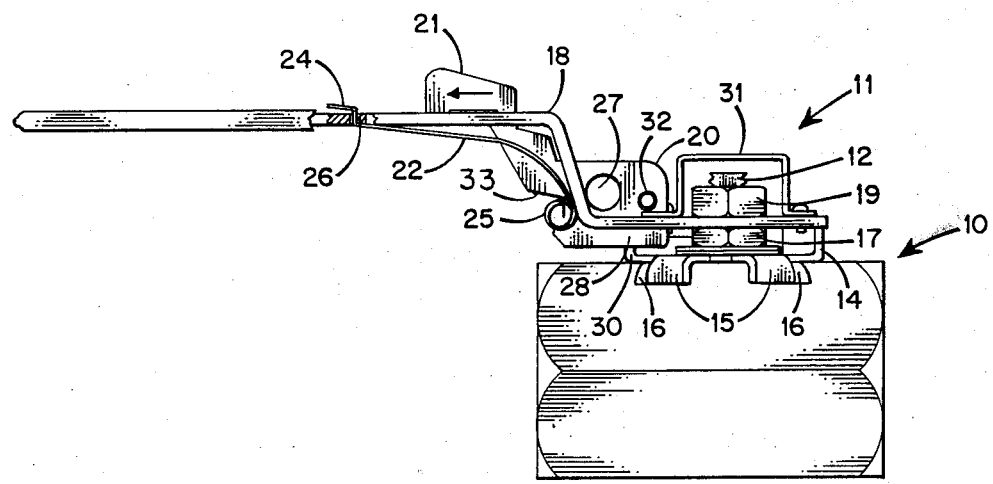
FIG. 1 is a front elevation of a ball valve with a latching
assembly according to the invention.
Figure 2:
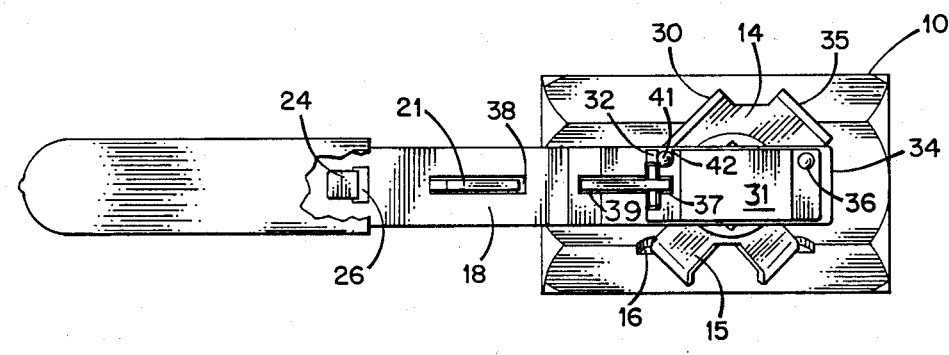
FIG. 2 is a top plan view of the device of FIG. 1.

Referring to FIGS. 1 and 2, ball valve 10 is operated by latching handle assembly 11. Latch plate 14 is secured over valve stem 12 by nut 17. Two recesses, 16, in valve 10 receive lugs 15 bent down from plate 14 so as to fix the position and prevent rotation of plate 14. Handle 18 may be stamped from sheet metal and bent twice in opposite directions to provide two ends that are parallel and displaced from each other. The depicted handle uses bends of about 70 degrees.

Handle 18 fits over stem 12 on top of nut 17 and is secured by second nut 19. Latch 20 slides in apertures 38 and 39 of handle 18. Latch operator 21 is a tab on latch 20 that projects up through aperture 38. Spring 22 has slot 23 for latch 20, tab 24 at one end and spring roll 25 at the other. Tab 24 is designed to pass into aperture 26 of handle 18 to secure a first end of spring 22. Roll 25 is retained by notch 33 in latch 20 so as to urge latch 20 in the direction of latch plate 14.

In the position shown, with latch 20 all the way forward toward latch plate 14 and stem 12, corner 28 of latch 20 is against lug 30 of latch plate 14. In the same position End 34 of handle 18 is against lug 35 of plate 14 so that handle 18 cannot turn in either direction. When latch 20 is retracted against spring 22 by latch operator 21, corner 28 disengages from lug 30 allowing handle 18 to rotate clockwise 90 degrees. Upon rotation by 90 degrees, handle 18 comes up against lug 35. Release of latch operator 21 then causes latch 20 to slide in against lug 30 latching handle 18 in the new position. Pin 32 driven through latch 20 above corner 28 holds the vertical position of latch 20 by riding on top of handle 18.

Cap 31 is depicted as a flat piece of metal bent into and upsidedown U-shape with the legs of the U bent out at their ends. Rivet 36, through the corner of one leg of cap 31, rivets cap 31 to end 34 of handle 18. Rivet 36 is loose enough to permit cap 31 to rotate on the rivet. Cap 31 extends over stem 12 and nut 19. The second leg of cap 31 has slot 37 centered in its end and notch 42 on one side. Notch 42 accepts rivet 41 in handle 18 acting as a stop when cap 31 is completely over nut 19. Slot 37 receives the end of latch 20 in its forward position. With latch 20 engaging slot 37, cap 31 cannot be rotated away from nut 19 and prevents removal of nut 19. When latch 20 is retracted, cap 31 can be rotated allowing access to nut 19.

Aperture 27 in latch 20 is just forward of aperture 39 in handle 18 and may be used for a padlock. With the shank of a padlock in aperture 27, latch 20 cannot be retracted.

Figure 3:
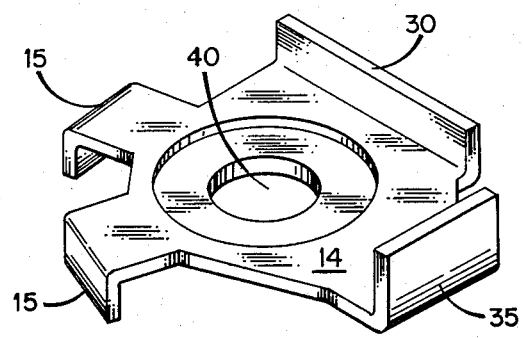
FIG. 3 is a view in perspective of a latch plate according to the invention.
Figure 4:
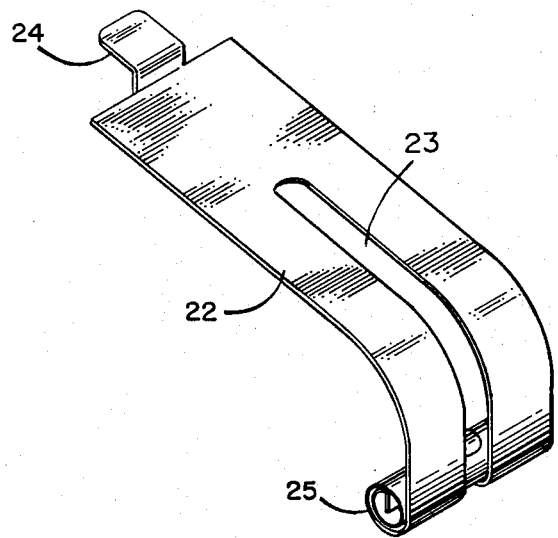
FIG. 4 is a view in perspective of a latch spring according to the invention.

FIG. 3 shows latch plate 14 in greater detail. Aperture 40 is for stem 12 and the recess around aperture 14 may be used to retain washers. Lugs 15 are to engage recesses or notches in the body of a control device and are shaped and positioned to match such recesses or notches. Lugs 30 and 35 function as tops. Lug 35 is higher than lug 30 so that lug 35 stops handle 18 while lug 30 does not. Lug 30 engages latch 20 on either side. While latch plate 14 is depicted for stops at two 90 degree displaced positions, variations in latch plate 14 will provide other stop positions. For example, lug 30 may be segmented to provide a series of slots for latch 20 to engage at different rotational positions.

Spring 22 is unique for operating a latching member in a handle. It is simple to manufacture and very easy to install or replace. When rolled end 25 is pulled backward out of notch 39, spring 22 can be rotated downward disengaging tab 24 from handle 18 for quick and easy removal.

While the invention has been described with respect to a specific embodiment, variations within the skill of the art are contemplated as within the scope of the invention. For example the pieces depicted and described as made from sheet metal can also be diecast or molded from plastic. Although a ball valve has been depicted as the control device, other types of valves, fluid or electrical control devices can utilize the invention.

We claim:

1. A rotatable valve with a latching handle comprising:
   (a) a valve body (10) having recesses (16);
   (b) a valve stem (12);
   (c) a latch plate (14) secured over said valve stem (12) having bent down lugs (15) received by said recesses (16) whereby said latch plate (14) is fixed in a predetermined position, and at least two upward turned lugs (30,35);
   (d) a handle (18) secured over said valve stem (12) engaging a first of said upward turned lugs (35) in a first position and again in a second position;
   (e) a latch (20), sliding in apertures (38,39) in said handle (18), engaging a second of said upward turned lugs (30) in a first position and again in a second position; and,
   (f) a spring (22) having a tab (24) at one end securing said spring (22) in an aperture (26) in said handle (18) and a spring roll (25) at a second end retained by a notch (33) in said latch (20) so as to urge said latch (20) in the direction of said latch plate (14).

2. A latching handle for control devices comprising:
   (a) a latch plate (14) securable over a rotatable shaft (12) of a control device in a predetermined position, said latch plate having at least two downward turned lugs (15) for engaging said control device and at least two upward turned lugs (30,35);
   (b) a handle (18) securable over said shaft (12) on top of said plate (14) for rotation of said shaft (12);
   (c) a reciprocating latch (20) built into said handle (18) for engaging said plate (14) at predetermined positions of rotation of said handle (18), said upward turned lugs (30,35) engaging said handle (18) and said latch (20);
   (d) a spring (22) engaging said latch (20) and urging said latch (20) toward a latched position; and,
   (e) a manually operable release tab (21) for retracting said latch (20) from the latched position.

3. A latching handle according to claim 2 wherein said upward turned lugs (30,35) have different lengths such that the longer one (35) engages said handle (18) while the shorter one (30) only engages said latch (20).

4. A latching handle according to claim 2 wherein said handle (18) contains two slot apertures (38,39), said latch (20) reciprocates in said two slot apertures (38,39) to engage said upward turned lugs (30), said spring (22) is a flat spring rolled at one end (25), has a tab (24) at another end that is secured in a third aperture (26) in said handle (18) and said one end (25) is secured in a notch (33) in said latch (20) so as to urge said latch (20) toward said latch plate (14).

5. A latching handle according to claim 2 wherein said handle (18) is securable on said shaft (12) by a nut (19), a cap (31) pivotally mounted to said handle (18) by a rivet (36) can be pivoted to cover said nut (19) and a slot (37) in said cap (31) is engageable by said latch (20) to prevent pivoting of said cap whereby said nut (19) is secured against removal when said handle is latched.

* * * * *